No. 801,277. PATENTED OCT. 10, 1905.
E. STANCLIFF.
FRICTION GRIP MECHANISM.
APPLICATION FILED MAR. 1, 1905.
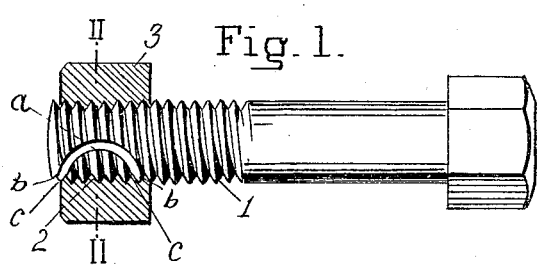
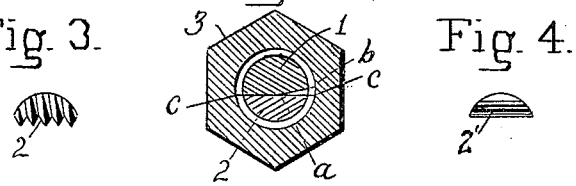
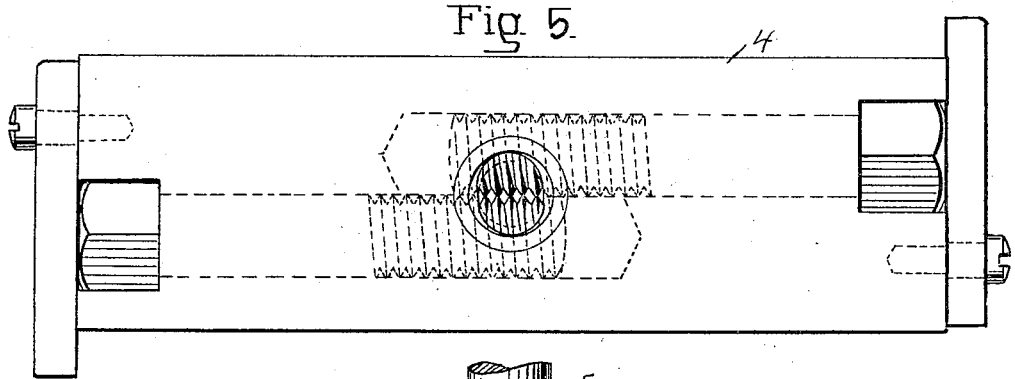
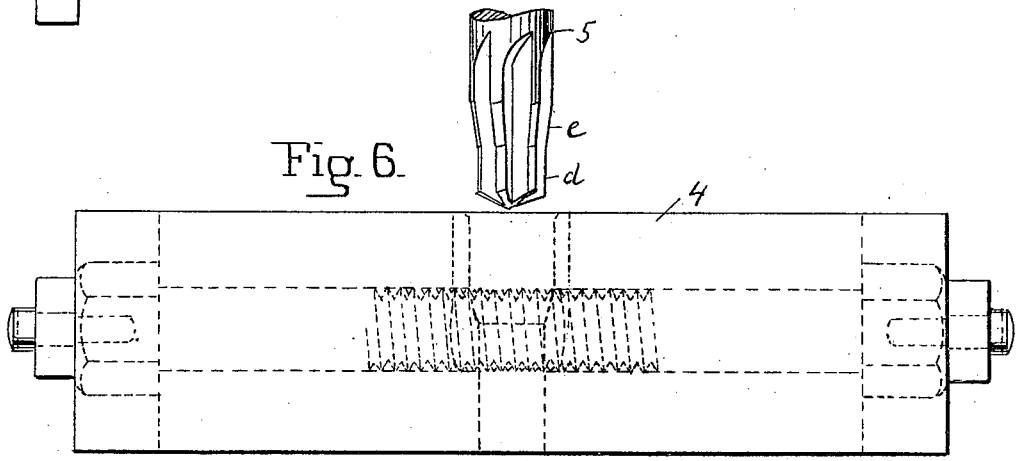
Witnesses:
Samuel W. Balch
H. H. Whitman
Inventor,
Edwin Stancliff,
by Thomas Ewing Jr.
Attorney.

UNITED STATES PATENT OFFICE.

EDWIN STANCLIFF, OF NEW YORK, N. Y.

FRICTION-GRIP MECHANISM.

No. 801,277.  Specification of Letters Patent.  Patented Oct. 10, 1905.

Application filed March 1, 1905. Serial No. 247,906.

*To all whom it may concern:*

Be it known that I, EDWIN STANCLIFF, a citizen of the United States of America, and a resident of the city, county, and State of New York, have invented certain new and useful Improvements in Friction-Grip Mechanism, of which the following is a specification.

This invention is an improvement upon the invention disclosed in my prior patents, No. 514,570, dated February 13, 1894, for a nut-locking bolt; No. 514,571, dated February 13, 1894, for friction-grip mechanism; No. 537,244, dated April 9, 1895, for nut-locking bolt, and No. 577,521, dated February 23, 1897, for nut-locking bolt, in each of which a shaft is transversely cut or notched by a flat-bottomed notch or cut, with one side of the notch or cut further cut away to form a rocking edge, and a rocking piece is fitted into the notch to make the shaft complete.

The object of this invention is to make a semicylindrical cut transversely across the shaft in lieu of the forms of cuts disclosed in the above-mentioned patents, whereby the cutting of the notch can be effected in a less expensive manner by means of a rotary tool, as a suitably-guided drill.

A further object of the invention is to form the rocking edge with a further cutting away by a conical surface or other surface of rotation having the same axis as the semicylindrical surface forming the main portion of the notch, whereby the forming of both the main portion of the notch and the cut-away portion may be concurrently effected by the same tool.

A further object of the invention is to form a notch with the cylindrical surface of the same diameter as the outside of the shaft taken at the bearing-surface of the rocking piece, whereby the rocking piece is reversible, so that less care need be exercised in assembling the parts.

My invention is applicable in various devices, such as are illustrated in my prior patents above enumerated; but one of its principal applications is to nut-locking bolts, in connection with which it is herein specifically illustrated in the accompanying sheet of drawings, which forms a part of this application, in which—

Figure 1 is an elevation of a nut-locking bolt embodying my invention with the nut shown in section. Fig. 2 is a transverse section through the bolt and nut on the line II II of Fig. 1. Fig. 3 is a separate view of the rocking piece. Fig. 4 is a modified rocking piece without thread. Fig. 5 is a top view of a jig in which the bolts are inserted for notching. Fig. 6 is a side view of the jig, together with a counterboring-drill for forming the semicylindrical notch and the conical cut-away portion.

A bolt, the body portion of which, 1, carries the head and thread in the usual manner, is notched transversely through the threaded portion with a semicylindrical cut $c\ c$, and one end of the notch is further cut away to a conical surface $a\ b\ b$, the cylindrical and conical surfaces meeting at $a$ and forming a rocking edge at a point eccentric to the axis of the bolt. A rocking piece 2 is fitted into the notch, so as to make the bolt complete, except for the conical cut-away portion, and the rocking edge lies in the general longitudinal direction of the bolt at the point at which the rocking piece bears and about which the rocking piece would tend to rock when an attempt is made to unscrew the nut 3.

The notch in the bolt, including the cut-away portion, is formed by placing the bolt in a jig 4, as illustrated in Figs. 5 and 6, provision being made for the insertion of two bolts and simultaneous operation on both. The cutting is effected by a counterboring-drill 5 of proper diameter at the tip $d$ for forming the main portion of the notch and having a conical counterbore portion $e$ for forming the cut-away portion of the notch.

The rocking piece is preferably a casting or forging of the finished size, so that it does not require to be machined. If a rocking piece with a smooth instead of threaded face is used, the notch is preferably made of the same curvature as the face, so that the rocking piece may be placed in the notch either side up.

What I claim as new, and desire to secure by Letters Patent of the United States, is—

1. In a friction-grip mechanism, a shaft formed with a semicylindrical notch transversely across one side of the shaft, and a rocking piece fitting into the notch to make the shaft complete, one of the parts being cut away to form a longitudinal rocking edge so positioned that if the rocking piece is rocked in one direction the combined diameter of the rocking piece and shaft is increased beyond their combined diameter when the parts are rocked upon this edge in the other direction, substantially as described.

2. In a friction-grip mechanism, a shaft formed with a semicylindrical notch transversely across one side of the shaft, which notch is cut away at one end by a surface having the same axis as the notch to form a longitudinal rocking edge, and a rocking piece fitting into the notch to make the shaft complete except at the cut-away portion of the notch, the longitudinal rocking edge being so positioned, that if the rocking piece is rocked in one direction the combined diameter of the rocking piece and shaft is increased beyond their combined diameter when the rocking piece is rocked upon this edge in the other direction, substantially as described.

3. In a friction-grip mechanism, a shaft formed with a semicylindrical notch transversely across one side of the shaft, which is cut away to form a longitudinal rocking edge, and a rocking piece both sides of which have the same amount of curvature and fitting into the notch, substantially as described.

4. A nut-locking bolt formed with a semicylindrical notch transversely across one side of the shaft, which notch is cut away to form a longitudinal rocking edge, the cylindrical portion of the notch having the same diameter as the bottom of the thread, and an unthreaded rocking piece fitting into the notch, the outwardly-facing surface of the rocking piece being a cylindrical surface of the diameter at the bottom of the thread of the bolt, substantially as described.

Signed by me at New York city, New York, this 28th day of February, 1905.

EDWIN STANCLIFF.

Witnesses:
SAMUEL W. BALCH,
HY. H. WHITMAN.